United States Patent Office 3,778,505
Patented Dec. 11, 1973

3,778,505
LITHIUM SALT BASED PHARMACEUTICAL COMPOSITION AND METHODS OF USE
Liliane Saint-Martin, Bourg-la-Reine, France, assignor to Societe Civile de Recherches et d'Etudes Therapeutiques, Anthony, France
No Drawing. Filed Nov. 29, 1971, Ser. No. 203,040
Claims priority, application France, Dec. 1, 1970, 7043183; June 17, 1971, 7122039
Int. Cl. A61k 27/00
U.S. Cl. 424—317          11 Claims

ABSTRACT OF THE DISCLOSURE

A pharmaceutical composition for the treatment of mental affections contains, in dosage form, between about 0.25 and 2.5 g. per administrable dose of a lithium salt of an acid selected from the group consisting of gluconic acid and its isomers, glucoheptonic acid and its isomers, the phosphates of the compounds and mixtures thereof.

---

The present invention relates to novel pharmaceutical compositions comprising a lithium salt base.

It is already known to orally administer to humans lithium salts for treating certain mental affections, particularly manic-depressive psychoses, melancholies or manic states. In particular, there have already been prescribed for this purpose certain compositions containing lithium bromide, lithium carbonate, trilithic citrate or lithium chloride.

The results obtained in these treatments using these particular lithium containing compounds are generally considered satisfactory, but such treatments ordinarily require the administration of high initial doses of the said lithium compounds followed by a maintenance treatment also involving the administration of large doses of the lithium compound.

It is current practice to administer, as initial treatment, a lithium salt corresponding to a daily dose corresponding to about 0.5 g. of metal lithium, for seven to ten days and then to continue with daily doses corresponding to about 0.15 to 0.20 g. of lithium, for long periods.

Unfortunately, such high lithium doses cannot be administered without disadvantageous side effects occurring in a certain number of patients. These more or less serious side effects are of a digestive nature corresponding to a beginning of intoxication, or of a nervous nature and, in extreme cases, can lead to encephalopathies or even to comas with epileptiform crises or again to renal troubles with the appearance of albuminuria which requires immediate interruption of treatment under thread of mortal danger.

Consequently, those lithium salts presently suggested for use in the treatment of the mental maladies mentioned above can be used only with great care, because the doses that have to be administered to achieve the desired results are rather close to those at which toxicity appears.

The present invention is based on the surprising discovery that concentrated solutions of a lithium salt of an acid selected from the group consisting of gluconic acid and its isomers, glucoheptonic acid and its isomers, the phosphates of these compounds and their mixtures, can be effectively used orally for treating mental diseases such as manic-depressive psychoses, melancholies or manic states, by being administered at doses corresponding to metal lithium which are considerably less than the required doses of other lithium salts present being used.

Consequently, by employing, according to the invention, a lithium salt of one of the acids mentioned above rather than currently utilized lithium salts, it is possible to obtain identical and even superior therapeutic results, without having to prescribe daily doses which approach toxic doses. Because of this characteristic, the compositions according to the invention, make it possible to treat the patients effectively without the appearance of the disadvantageous side effects noted above, due to the toxicity of lithium.

The present invention has for its object a novel medical composition, comprising an ingestible carrier and between about 0.25 and 2.5 g., preferably between 0.5 and 1.5 g. per administrable dose of a lithium salt of an acid selected from the group consisting of (a) gluconic acid and its isomers, (b) glucoheptonic acid and its isomers, (c) the phosphates of (a) and (b) and (d) mixtures thereof In a particular embodiment, the compositions of the present invention comprise a solution containing between 5 and 50 g., preferably between 10 and 30 g., for example, 20 g. of a lithium salt as defined above, per 100 ml. of an ingestible liquid.

Representative gluconic acid isomers that can be admitted in the present invention is one made up of an aqueous solution such as water flavored with a fruit juice, syrup or extract. Obviously, other ingestible liquids conventionally employed in the preparation of orally administered medicaments can also be employed. When the composition of the present invention is in a liquid form, it can, for example, be packaged in 5-ml. ampoules.

In a preferred embodiment of the present invention, the compositions can also contain sodium chloride, for example, in an amount of about 0.025 to 0.1 g. per administrable dose.

Representaive gluconic acid isomers that can be advantageously employed in the present invention include mannomic, galactonic and talonic acids. Further, other pentahydroxycaproic acids which are isomers of gluconic acid, also make it possible to obtain good results.

Representative isomers of glucoheptonic acid that can effectively be used in the present invention include levulose carboxylic acids which, in the form of lithium salt, also achieve good results. Other hexahydroheptanoic acids can also be employed. Lithium gluconate and its isomers correspond to the empirical formula: $C_6H_{11}O_7Li$, while the lithium glucoheptanoate and its isomers correspond to the empirical formula: $C_7H_{14}O_8Li$.

The pharmaceutical compositions according to the invention, for example those packaged in drinkable 5-ml. ampoules, can, for initial treatment, be administered at a rate of six ampoules per day, regularly distributed over the 24-hour period. Thereafter, the maintenance treatment can be performed at a rate of two ampoules daily.

According to a particular embodiment of the present invention, the pharmaceutical composition preferably contains lithium gluconate.

In accordance with this embodiment, the composition contains 20 g. of lithium gluconate per 100 ml. of the ingestible liquid or carrier and the initial treatment, at six amopules of 5-ml. capacity therefore corresponds to the administration of 180 mg. of metal lithium per day. The gluconate dosage governed by the metal lithium dosage with the lithium gluconate being assumed to crystallize with 2 molecules of water.

Now, according to the literature, the same therapeutic effects can be obtained only with initial doses of lithium carbonate or citrate which correspond to a daily administration of about 500 mg. of metal lithium, i.e. a dosage about three times stronger than that of the present invention, which explains that by using the compositions of the present invention, it is possible to avoid well known intolerances of lithium carbonate or citrate.

The initial treatment or dosage as just described, is maintained until a serum lithium rate is obtained between about 0.5 and 1.5 milliequivalent per liter, a rate for which the morbid symptoms disappear in most cases. The posology is then reduced during maintenance treatment which can continue indefinitely without any substantial serious drawback, at doses selected to keep the serum lithium rate at this same value of about 0.5 to 1.5 milliequivalent per liter.

In general, a daily dose of about 60 mg. of metal lithium suffices, if it is administered in the form of the lithium salt of this invention, for example, lithium gluconate, whereas with other previously known and used salts, considerably larger doses, of the order corresponding to 150 to 200 mg. of metal lithium, would be required.

This superiority of the composition according to the present invention is very clearly brought out when it is observed that in the treatment of a malady, the substitution of the composition of this invention for a previously known composition containing, for example, lithium carbonate, requires a reduction of the daily dosage of metal lithium to maintain the serum lithium rate at the same value.

The present invention also has for its object a process for treating mental affections such as manic-depressive, melancholies or manic states characterized by the fact that in the initial treatment, there are administered to patients afflicted with these affections daily doses of about 2 to 8 g. of a lithium salt of an acid selected from the group consisting of (a) gluconic acid and its isomers, (b) glucoheptonic acid and its isomers, (c) the phosphates of (a) and (b), and (d) mixtures thereof, these daily doses being maintained until a serum lithium rate is obtained between 0.5 to 1.5 milliequivalent per liter.

According to this process, the initial treatment is followed by a maintenance treatment which consists in administering smaller daily doses of the present composition which doses make it possible to maintain the serum lithium rate at this value of 0.5 to 1.5 milliequivalent per liter.

The preparation of lithium salts, of gluconic acid and its isomers, of glucoheptonic acid and its isomers and phosphates of said compounds can be performed for instance by the following methods:

(1) By double decomposition—a method which consists of first making the barium or calcium salt of the acid; diluting the same so that it is in isotropic solution; and then precipitating from this solution the lithium salt of the acid, by the addition thereto of an inorganic lithium salt, as for example, lithium chloride.

(2) Or by direct action of lithium oxide on the acid from which the salt is to be prepared.

EXAMPLE I

A composition, intended to be ingested, is made by mixing:

Lithium gluconate _____ g__ 20
Water sufficient for 100 g.

This mixture is then packaged in 5-ml. ampoules and is administered to the patient presenting a manic-depressive mental affection at a rate of six ampoules per day for 3 to 4 days. On the fourth day, the serum lithium rate is about 1.2 milliequivalent per liter. The maintenance treatment, so as to keep this serum lithium rate, is then continued at a rate of 2 to 3 ampoules per day.

EXAMPLE II

An ingestible composition is prepared by mixing:

Lithium gluconate _____ g__ 35
Raspberry syrup, sufficient for flavoring.
Water, sufficient for 100 g.

This mixture is then packaged in 5-ml. ampoules and is administered to a patient presenting depressive psychoses at a rate of 4 ampoules per day for 4 days. At the end of this time, the serum lithium rate is about 1 to 1.2 milliequivalent per liter. A maintenance treatment is then continued by administering 1 to 2 ampoules so as to keep the serum lithium rate constant.

After this treatment, the depressive psychoses disappear.

EXAMPLE III

An ingestible composition is prepared by mixing:

G.
Lithium gluconate _____ 25
Orange juice, sufficient for flavoring.
Sodium chloride _____ 0.6
Water, sufficient for 100 g.

This mixture is administered in 5-ml. ampoules to a patient presenting a manic-depressive state at a rate of 5 ampoules per day. The serum lithium rate of 0.8 to 1 milliequivalent is obtained after 4 days of treatment. This serum lithium rate is maintained during maintenance treatment by the administration of 1 to 2 ampoules per day.

After this treatment, the manic-depressive state disappears.

EXAMPLE IV

An ingestible composition is prepared by mixing:

G.
Lithium gluconate _____ 15
Sodium chloride _____ 1.02
Water sufficient for 100 g.

This composition is administered in 5-ml ampoules to a patient presenting certain psychoses at a rate of 7 ampoules per day. After 3 days the serum lithium rate is 1.1 to 1.3 milliequivalent per liter. This serum lithium rate is maintained during the maintenance treatment by the administration of 2 to 3 ampoules per day.

After this treatment, the psychoses disappear.

Identical results are obtained when the lithium gluconate in the previous compositions is replaced by the lithium salt of glucoheptonic acid or its isomers or again by using the lithium salt of phosphates of said compounds.

It is to be noted that the solutions of the lithium salt of one of the acids mentioned above in a liquid constitute a preferred, but not exclusive form of the composition according to the invention, which can also be in the form of a suitable amount of lithium salt dispersed or dissolved in any other pharmaceutical vehicle.

What is claimed is:

1. A pharmaceutical composition for treating manic-depressive psychoses, melancholies or manic states, comprising an ingestible carrier and about 0.25 to 2.5 g. per administrable dose of a lithium salt of an acid selected from the group consisting of gluconic acid and glucoheptonic acid.

2. The composition of claim 1 wherein said lithium salt is present in amounts of between 0.5 and 1.5 g. per administrable dose.

3. The composition of claim 1 wherein said lithium salt is lithium gluconate.

4. The composition of claim 1 also including sodium chloride.

5. The composition of claim 4 wherein said sodium chloride is present in amounts of between 0.025 and 0.1 g. per administrable dose.

6. The composition of claim 1 wherein the lithium salt is in the form of a solution containing 5 to 50 g. of said lithium salt per 100 ml. of an ingestible liquid.

7. The composition of claim 6 wherein said solution contains 10 to 30 g. of said lithium salt per 100 ml. of said ingestible liquid.

8. The composition of claim 7 wherein said ingestible liquid is an aqueous solution.

9. A process for treating manic-depressive psychoses, melancholies, or manic states comprising orally administering to a human as an initial treatment a daily dosage of about 2 to 8 g. of a lithium salt of an acid selected from the group consisting of gluconic acid and glucoheptonic acid, said dosage being continued daily until a serum lithium rate is obtained between about 0.5 and 1.5 milliequivalent per liter.

10. The process of claim 9 which includes, after obtaining said serum lithium rate between about 0.5 and 1.5 milliequivalent, continuing administering said lithium salt in doses sufficient to maintain said serum lithium rate.

11. The porcess of claim 9 wherein said lithium salt is lithium gluconate.

References Cited

Rogers et al. Amer. J. Psychiat. 128:2, August 1971, pp. 158–163.

Lancent, No. 7561, vol. 71, p. 216, July 27, 1968.

Gershol, S., Amer. J. Phychiat. 124:10, April 1968, pp. 1452–1456.

Amer. J. Psychiat. 124:6, December 1967, p. 862.

STANLEY J. FRIEDMAN, Primary Examiner